United States Patent
Kemp

(10) Patent No.: US 7,081,728 B2
(45) Date of Patent: Jul. 25, 2006

(54) APPARATUS FOR CONTROLLING HEAT GENERATION AND RECOVERY IN AN INDUCTION MOTOR

(75) Inventor: William H. Kemp, Clayton (CA)

(73) Assignee: Sequence Controls Inc., Carleton Place (CA)

( * ) Notice: Subject to any disclaimer, the term of this patent is extended or adjusted under 35 U.S.C. 154(b) by 0 days.

(21) Appl. No.: 10/926,966

(22) Filed: Aug. 27, 2004

(65) Prior Publication Data

US 2006/0043918 A1    Mar. 2, 2006

(51) Int. Cl.
*H02K 23/16*    (2006.01)
*H02K 23/18*    (2006.01)
*H02K 23/44*    (2006.01)
*H02K 37/00*    (2006.01)

(52) U.S. Cl. .................. 318/437; 318/727; 318/801; 318/778; 318/781; 318/796; 318/797; 417/423.8; 417/228

(58) Field of Classification Search ................ 318/437, 318/727, 801, 778, 781, 796, 797
See application file for complete search history.

(56) References Cited

U.S. PATENT DOCUMENTS

| 5,510,687 A * | 4/1996 | Ursworth et al. ............ 318/727 |
| 6,212,894 B1 * | 4/2001 | Brown et al. .................. 62/180 |
| 6,346,790 B1 * | 2/2002 | Kemp et al. ................. 318/813 |
| 6,536,678 B1 * | 3/2003 | Pouchak .......................... 237/7 |
| 6,747,367 B1 * | 6/2004 | Cline et al. .................... 307/11 |
| 6,778,936 B1 * | 8/2004 | Johansson .................... 702/128 |

FOREIGN PATENT DOCUMENTS

CA          2267035          9/2000

* cited by examiner

*Primary Examiner*—Rina Duda
*Assistant Examiner*—Erick Glass
(74) *Attorney, Agent, or Firm*—Marks & Clerk; Richard J. Mitchell

(57) ABSTRACT

An induction motor system comprising an induction motor, equipped with a heat recovery and water pumping apparatus and an apparatus for controlling the electrical efficiency and resulting heat generation of the induction motor. The motor is adapted to be coupled to an AC source for supplying an AC signal. The controlling apparatus includes a switching device, user controls and optional inputs. The switching device is connected in series with the motor and is operative in either a high impedance state wherein significant current flow through the motor is prevented or a low impedance state wherein current flow through the motor is substantially undisturbed. The user controls provide motor operational input signals. The optional inputs provide setpoint and sensed water temperature input signals. The controller means receives the motor operational setpoint and sensed water temperature input signals from the user controls and optional inputs, and switches the switching device between its low and high impedance states in a predetermined sequence for inducing a phase delay in the AC signal.

20 Claims, 9 Drawing Sheets

Fan Cooled Motor Operating Characteristics

Heat Recovery Motor Operating Characteristics

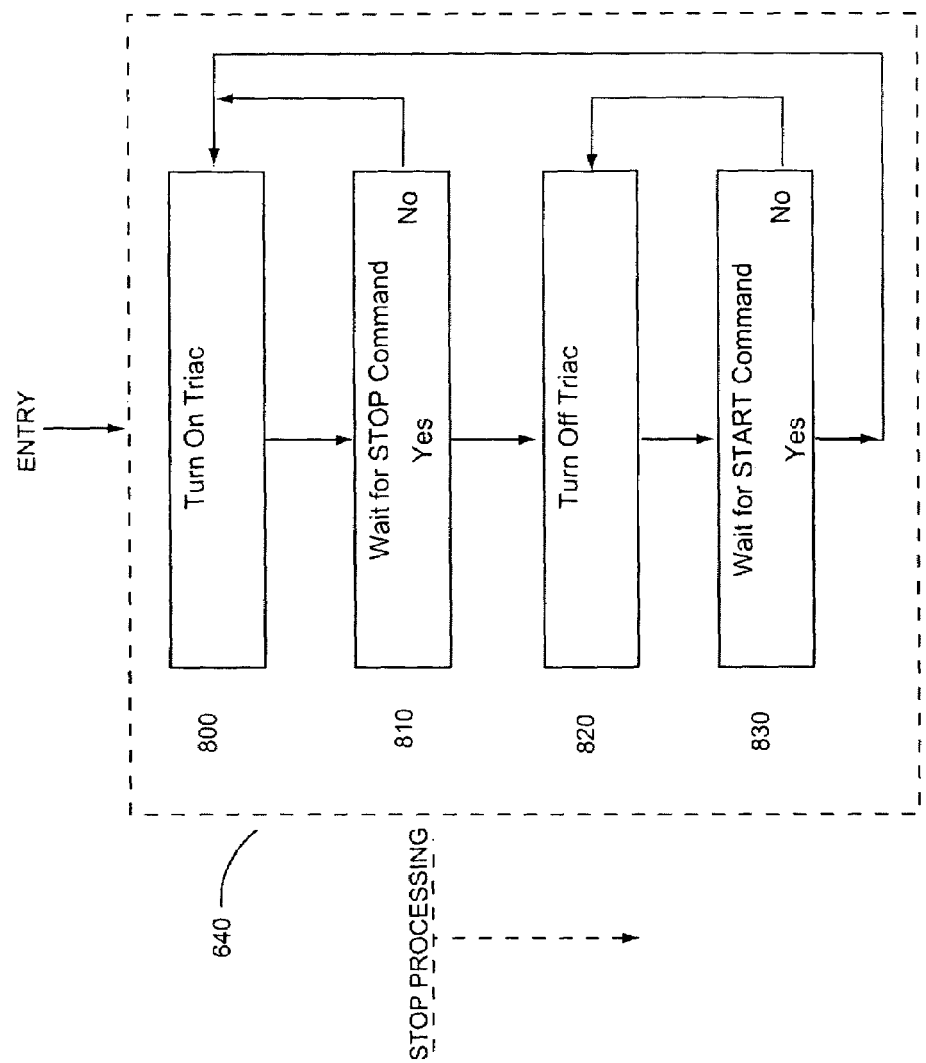

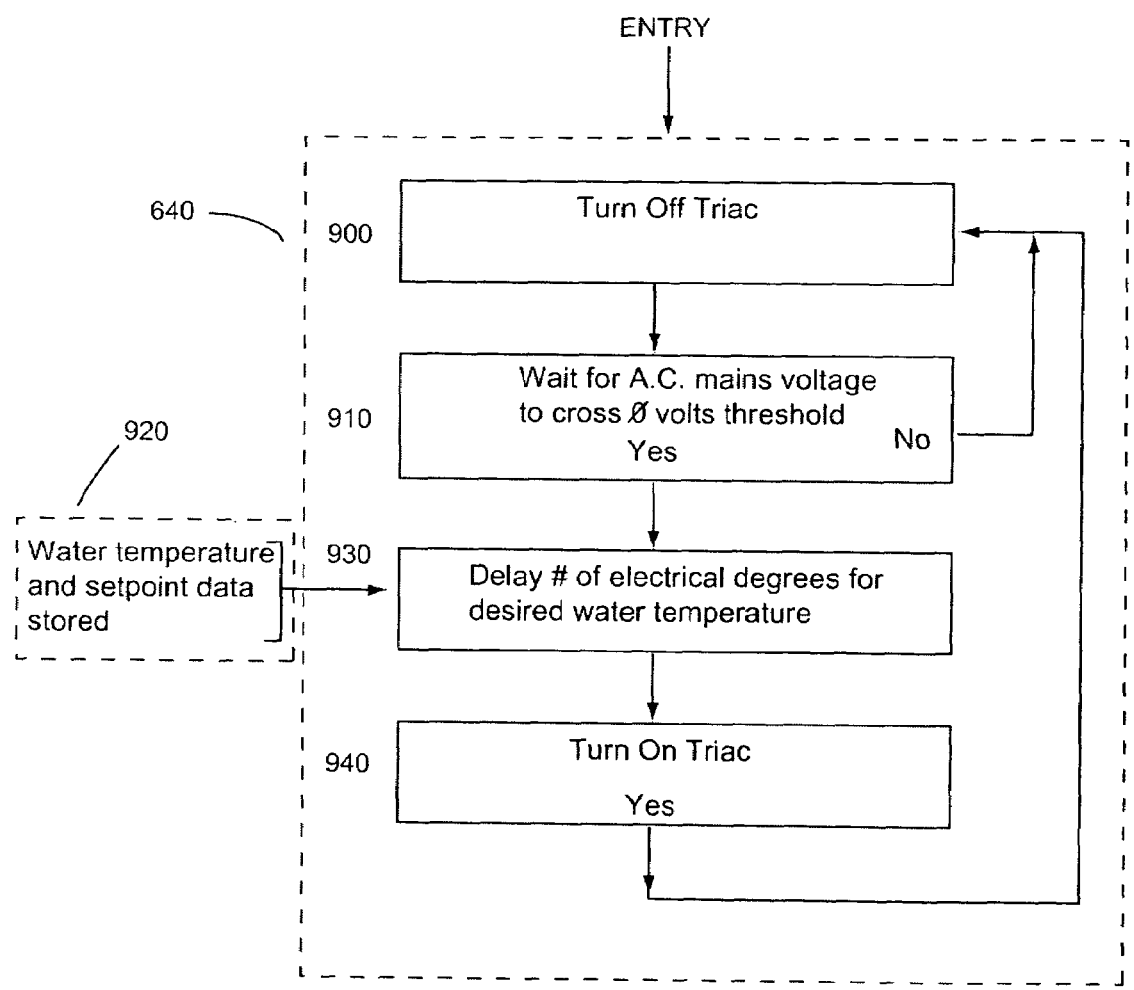

APPARATUS FOR CONTROLLING HEAT GENERATION AND RECOVERY IN AN INDUCTION MOTOR

FIELD OF THE INVENTION

The present invention relates generally to an apparatus used to control the electrical efficiency and resulting heat generation of an electrically operated A.C. induction motor. More particularly, the present invention relates to a controller coupled to a switching means and employing a voltage modulation to adjust the efficiency of an induction motor coupled to a heat recovery system.

BACKGROUND OF THE INVENTION

Bathing appliances such as hot tubs, swimming pools, shower units and hydromassage bath fixtures employ a means to control the flow of electrical energy to the pump motor, air blower, or other electrical loads associated with their use. The prior art means of providing this control may be very simple, for example a wall mounted switch or mechanical timer may be utilised to turn the circulation pump on and off.

An issue with bathing appliances, swimming pools and the like is cooling of the bathing water during operation. This may be caused by direct evaporation to cool night air in the case of a swimming pool or through the introduction of ambient air used to operate a bathing system hydrotherapy jets. The human body is keenly tuned to a very narrow "thermal comfort zone" and straying outside of this area by even a few degrees causes discomfort. For example, a person submerged in a hot-tub would find the water temperature cool below 38 degrees Celsius, while 41 degrees would be uncomfortably hot for most people.

It is obvious that water temperature requires careful regulation and that additional energy is required to provide makeup heat to offset natural cooling for the reasons cited above. It is common to provide this makeup heat by a hot water supply tap or by utilizing an integrated electric, gas-fired or other auxiliary heating device.

During operation, the electric motor of the recirculation pump has been found to become quite hot, requiring the use of cooling fans mounted as an integral part of the motor design. In addition, motors and pumps are generally mounted in enclosed areas, wherein the recirculation of cooling air further increases electric motor temperature. Manufacturers provide absolute operating temperature limits for their motor/pump devices to ensure equipment is not thermally damaged. It is well known to those skilled in the art that safety and regulatory agencies are very concerned about thermal damage to electric motors and that design and operating standards have been developed by many countries throughout the world.

In the past, it has been known to wrap a tubular coil around the pump motor and conduct bypass water through the tubular arrangement to extract heat for motor cooling and supplementary water heating. Improvements in this design have included "snap-on" plastic heat recovery jackets and oil-immersed motors with heat bypass tubes integrally mounted within the oil chamber.

Although each of the above prior art designs works more or less effectively than integrated fans to provide supplementary heat and lower motor operating temperature, they do not provide any control over the amount of heating power or delivered heat energy. For example, a given heat recovery system may provide 200 watts of power where 800 watts is required to maintain thermal equilibrium of the water. In such an example, supplementary heating would be required, rendering the heat recovery system of little heating capacity value.

Likewise, a heat recovery system may provide more heat to the water than is lost. Such a situation would result in water temperatures rising over time due to excessive heat energy input (heating power multiplied by time operated), perhaps beyond the safe operating limits determined by regulatory agencies and safety organizations. For example, a hot-tub which is certified to Underwriters Laboratories Inc. applicable standards must not exceed 41 degrees Celsius during normal operation.

A typical bathing appliance, hot tub or swimming pool pump utilises an alternating current, asynchronous electric motor, most commonly known as an induction motor. Induction motor design is well know to those skilled in the art. Motors of this configuration operate at a nominally fixed speed of rotation dependent on the number of magnetic poles in the motor and the frequency of the applied voltage. Motor designers optimize the motor design and fix the "voltage to frequency ratio" (hereinafter "V/F ratio") to provide maximum mechanical output while minimizing energy losses which result in the unwanted by-product of heat.

A typical motor connected to the North American supply mains circuit will have a V/F ratio of 2 (120 V÷60 Hz). Should the applied voltage to the motor be lowered while the frequency remains constant, the resulting V/F ratio will also lower resulting in high operating current, lower efficiency and additional heat output.

At some critical point on the V/F ratio curve, in combination with ambient air temperature and mechanical load, motor internal heating will exceed the ability of the internal fan to remove this heat and thermal runaway will occur. The motor's internal protective device will trip and the motor will cease to operate until it cools below a preset temperature.

If an effective heat recovery apparatus is incorporated in or upon the motor assembly, excess waste heat may be effectively removed and transferred to the bathing water.

SUMMARY OF THE INVENTION

Accordingly, the invention provides an apparatus which incorporates a voltage modulation control system to vary the V/F ratio with a heat recovery mechanism integrated to an A.C. induction motor. The present invention also permits the control of motor operating efficiency from its normal, optimum level to a lower efficiency level, utilising a control and feedback method, to provide supplementary heat energy to the heat recovery mechanism and recirculation water.

The invention also provides a closed-loop thermal feedback wherein a preset desired water temperature set point is input to a controller means and compared to the temperature of the recirculation water. The controller means adjusting the voltage of the V/F ratio to increase and decrease the efficiency and heat output of said motor and heat recovery system.

According to an aspect of the invention there is provided an apparatus for controlling the electrical efficiency and resulting heat generation of an induction motor, which is equipped with a heat recovery and water pumping apparatus and adapted to be coupled to an AC source for supplying an AC signal to the motor, comprising:

a switching device for coupling to the motor, the switching device being operative in either a first state wherein significant current flow through the motor is prevented or a second state wherein current flow through the motor is substantially undisturbed;

user controls for providing motor control input signals; and a controller responsive to at least the motor control input signals for controlling operation of the motor, said controller being operable to switch the switching device between said first and second states in a predetermined sequence so as to induce a phase angle delay in the AC signal supplied to the motor.

Optionally, the controller may have inputs for receiving water temperature and water setpoint temperature signals, the controller also being responsive to these signals.

In one embodiment, said first and second state comprise low and high impedance states respectively.

According to another aspect of the invention there is provided a method of controlling the electrical efficiency and resulting heat generation of an induction motor, which is equipped with a heat recovery and water pumping apparatus and is adapted to be coupled to an AC source for supplying an AC signal, comprising the steps of:

detecting a zero-crossing point of the positive half cycle of the AC signal and upon detecting said zero-crossing point of the positive half cycle of the AC signal switching a switching device coupled to the motor to a first state wherein significant current flow through the motor is prevented;

generating a first delay;

after the first delay, switching the switching device to a second state wherein current flow through the motor is substantially undisturbed;

upon detection of a zero-crossing point of the negative half cycle of the AC signal, switching the switching device to said first state;

generating a second delay; and after said second delay, switching the switching device to said second state.

BRIEF DESCRIPTION OF THE DRAWINGS

Embodiments of the invention will now be described in the accompanying drawings, in which:

FIG. 8 is a flow chart illustrating the normal or maximum efficiency operation of the present invention.

FIG. 9 is a flow chart illustrating the lowering of the V/F ratio utilizing a phase angle delay and thermal sensing feed back control method.

With respect to the above drawings, similar references are used in different Figures to denote similar components.

DETAILED DESCRIPTION OF THE INVENTION

Figure 1:
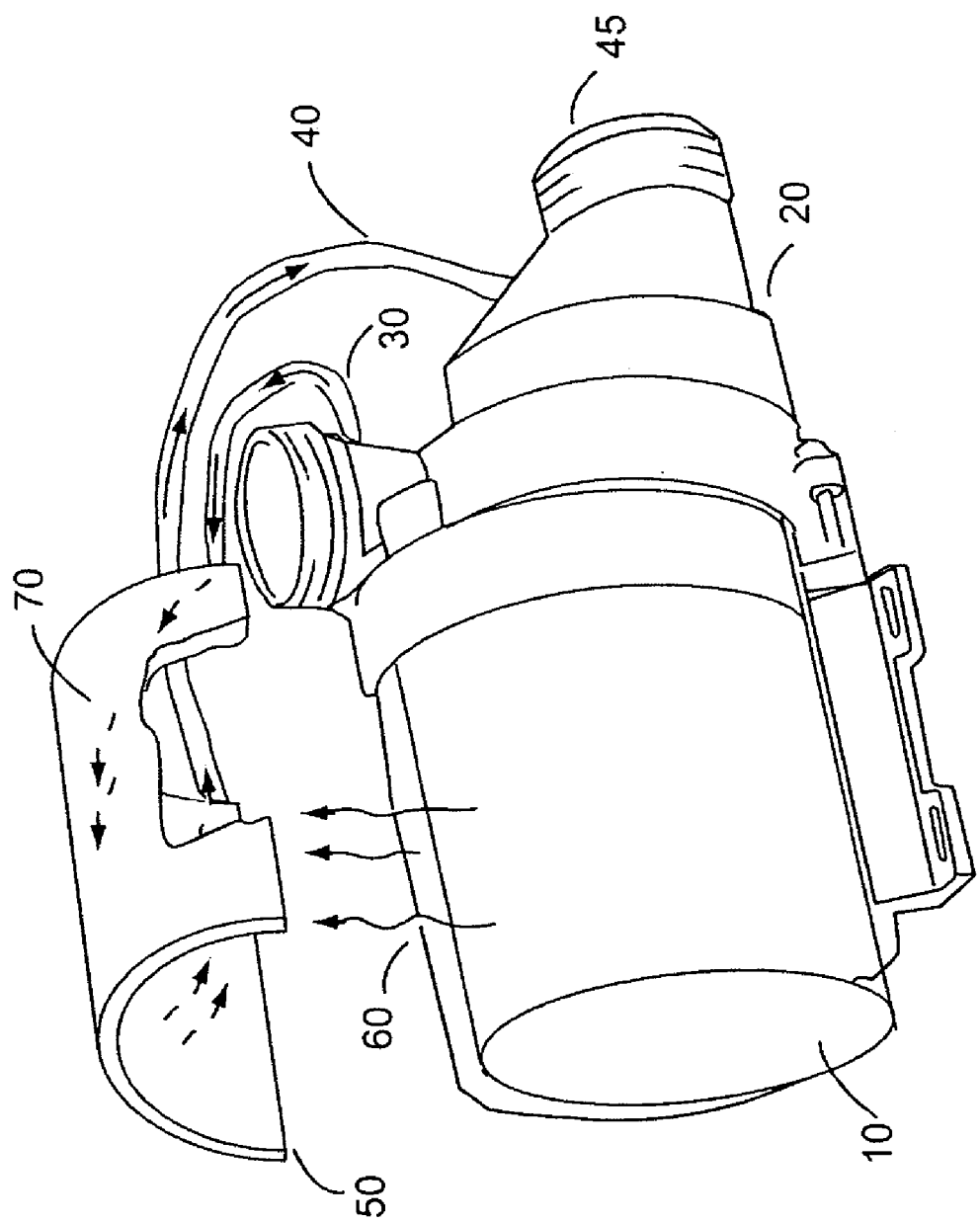
FIG. 1 is a typical induction motor shown with a prior art external heat recovery apparatus.

Referring particularly to the drawings, there is shown in FIG. 1 a prior art embodiment of a heat recovery system which may be retrofit to an existing induction motor. An induction motor 10 is connected to a pump means 20. The heat recovery apparatus 50 is attached to the motor 10 in such a manner as to ensure proper thermal conductivity 60 between the motor 10 and heat recovery apparatus 50.

During motor/pump operation, pressurized water 30 is delivered to the heat recovery apparatus 50. Water 70 flowing in the heat recovery apparatus 50 absorbs waste heat 60, and delivers heated water through pipe 40 at the low-pressure intake 45 of pump 20. Such systems are known to be inexpensive and simple to retrofit to existing motors, although thermal absorption between the motor and heat recovery apparatus is limited.

Figure 2:
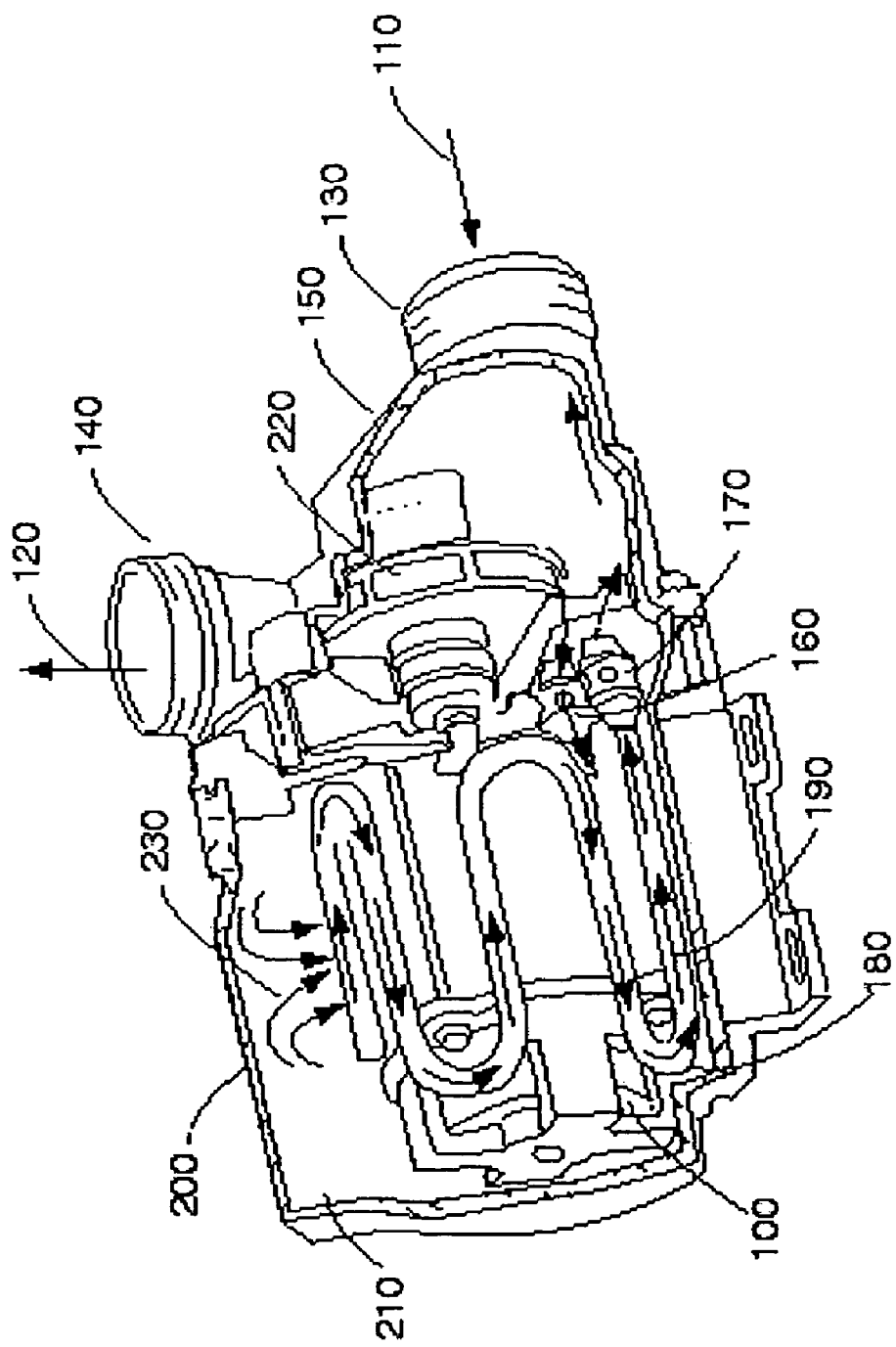
FIG. 2 is a section drawing of a prior art "wet rotor" induction motor with integral heat recovery apparatus.

Referring now to FIG. 2, there is shown an alternative prior art apparatus wherein the heat recovery apparatus is provided as an integral component of the induction motor. Induction motor assembly 100 is contained in motor housing 200, which is in turn filled with thermally conductive oil 210. Heat recovery apparatus 180 comprising thermally conductive tubing is connected between the low-pressure 170 and high-pressure 160 side of a recirculation pump 150. During operation water is introduced to the pump, low-pressure intake 110 and pressurized by the rotating impeller 220. Waste heat from motor 100 is transferred to oil 210, transferring it from the said oil to the said heat exchanger apparatus 230, warming water 190. Said warmed water is mixed with intake water 110, pressurized and fed to pump high-pressure outlet 140 for distribution to the plumbing system 120.

Heat recovery systems of this type are known to be more effective than clamp on or retrofit designs, such as the apparatus outlined in FIG. 1 and are particularly suited for heat recovery applications requiring significant amounts of energy.

Figure 3:
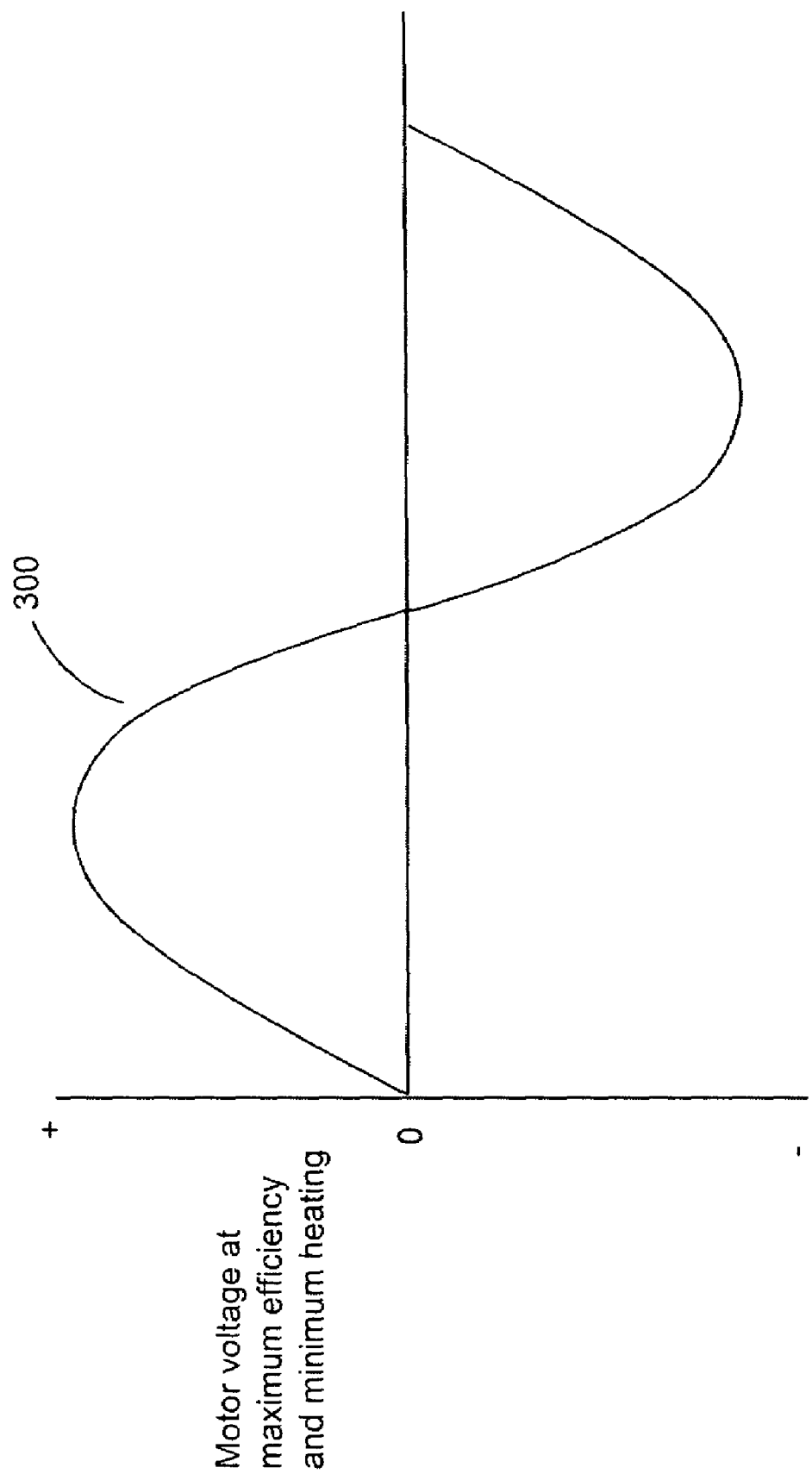
FIG. 3 is a waveform drawing of the voltage applied to the induction motor pump when running at nominal maximum efficiency and minimum heating levels.

Referring now to FIG. 3, there is shown one cycle of an alternating current sinusoidal waveform supplied from the AC mains. It is well known to those skilled in the art that induction motors are designed to accept a power supply input voltage and frequency, which is nominally sinusoidal and of a fixed voltage to frequency ratio, allowing the motor to operate at maximum efficiency and with lowest heat losses.

Figure 4:
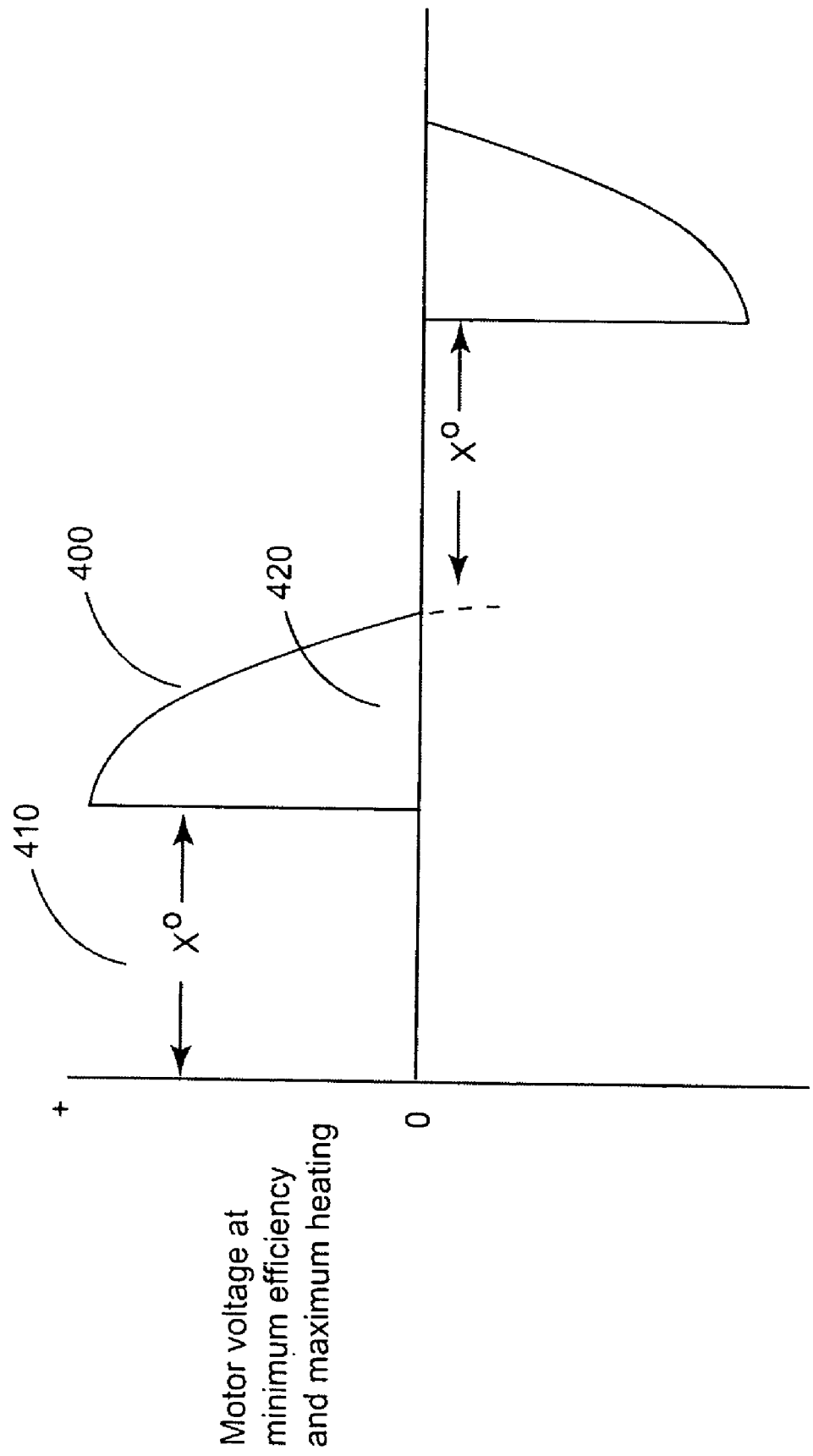
FIG. 4 is a waveform drawing of the phase-delayed voltage applied to the induction motor when running at lower efficiency and higher heating levels than outlined in FIG. 3.

Referring now to FIG. 4, there is shown an alternating current sinusoidal waveform 400, wherein a phase delay 410 has been applied. The resulting root mean square voltage (derived from the area under the curve 420) will lower the V/F ratio increasing motor current, reducing efficiency and thereby increasing heat output. Within bounds defined by the induction motor design, the larger the phase delay 410, the lower the motor efficiency and resulting heat output.

Figure 5:
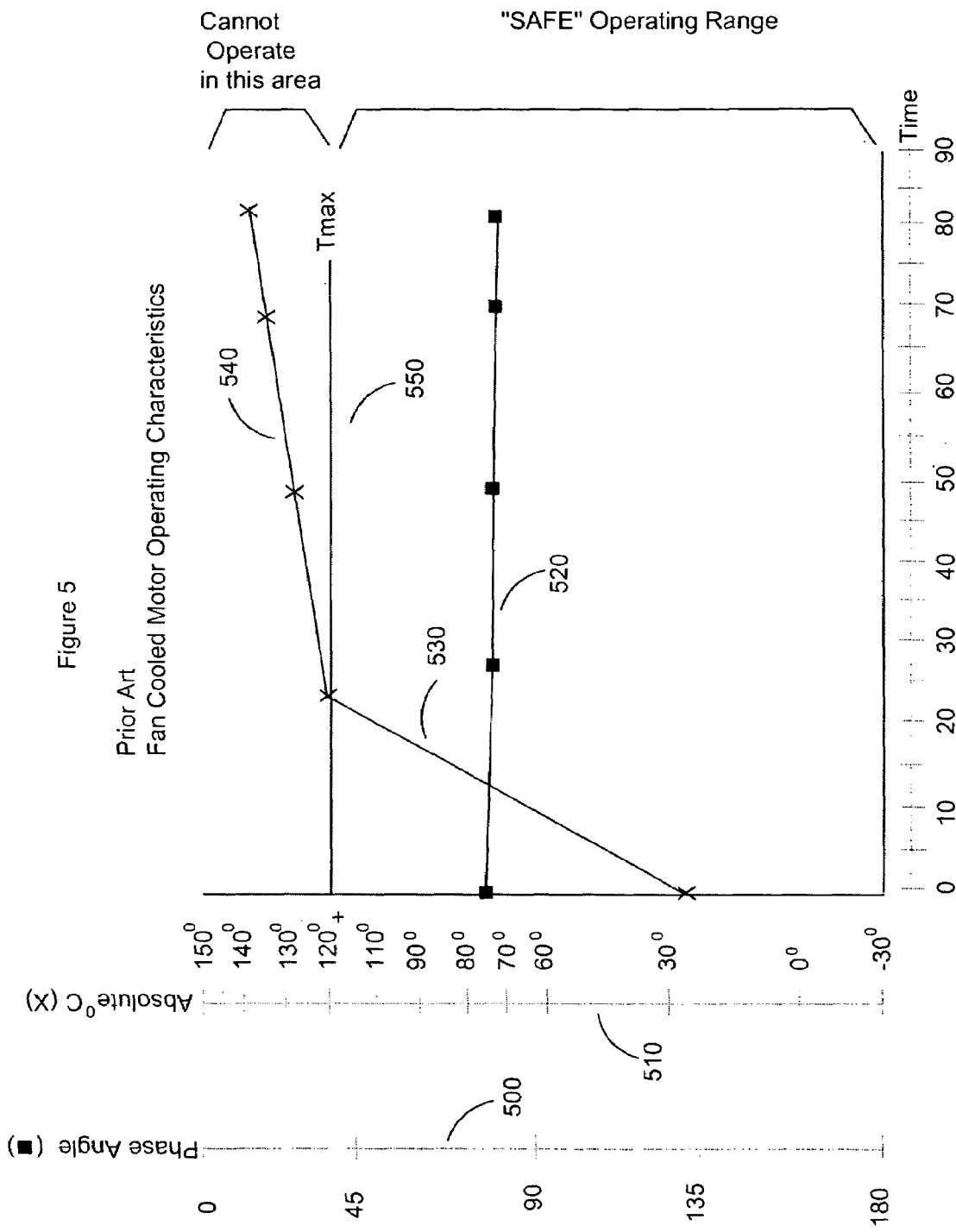
FIG. 5 is a graph showing the relationship between high-phase angle of the voltage applied to a fan-cooled motor and its winding temperature.

A typical induction motor equipped with fan cooling will often overheat when connected to a waveform described in FIG. 4. For example, the graph in FIG. 5 details the relationship of motor heating over a period of time when subjected to an input alternating current voltage with a significant phase delay as shown in FIG. 4. Referring to FIG. 5, there is shown a graph with a vertical "Y" axis which depicts a phase delay 500 of the applied sine wave voltage of approximately 80 electrical degrees 520. The second vertical axis depicts the absolute temperature of the subject motor 510. As the subject motor is operated, the temperature will rise from ambient and may reach the maximum operating temperature 550 as noted by line 530. A fan cooled induction motor will reach the maximum operating temperature 550 as a result of increased motor current and the inability of the fan and motor chassis to radiate the excess heat generated therein. As a result, the motor temperature will continue to rise above the maximum operating temperature limits 550 as noted by line 540. A person skilled in the art will recognize this condition depicted by line 540 to be thermal runaway.

Figure 6:
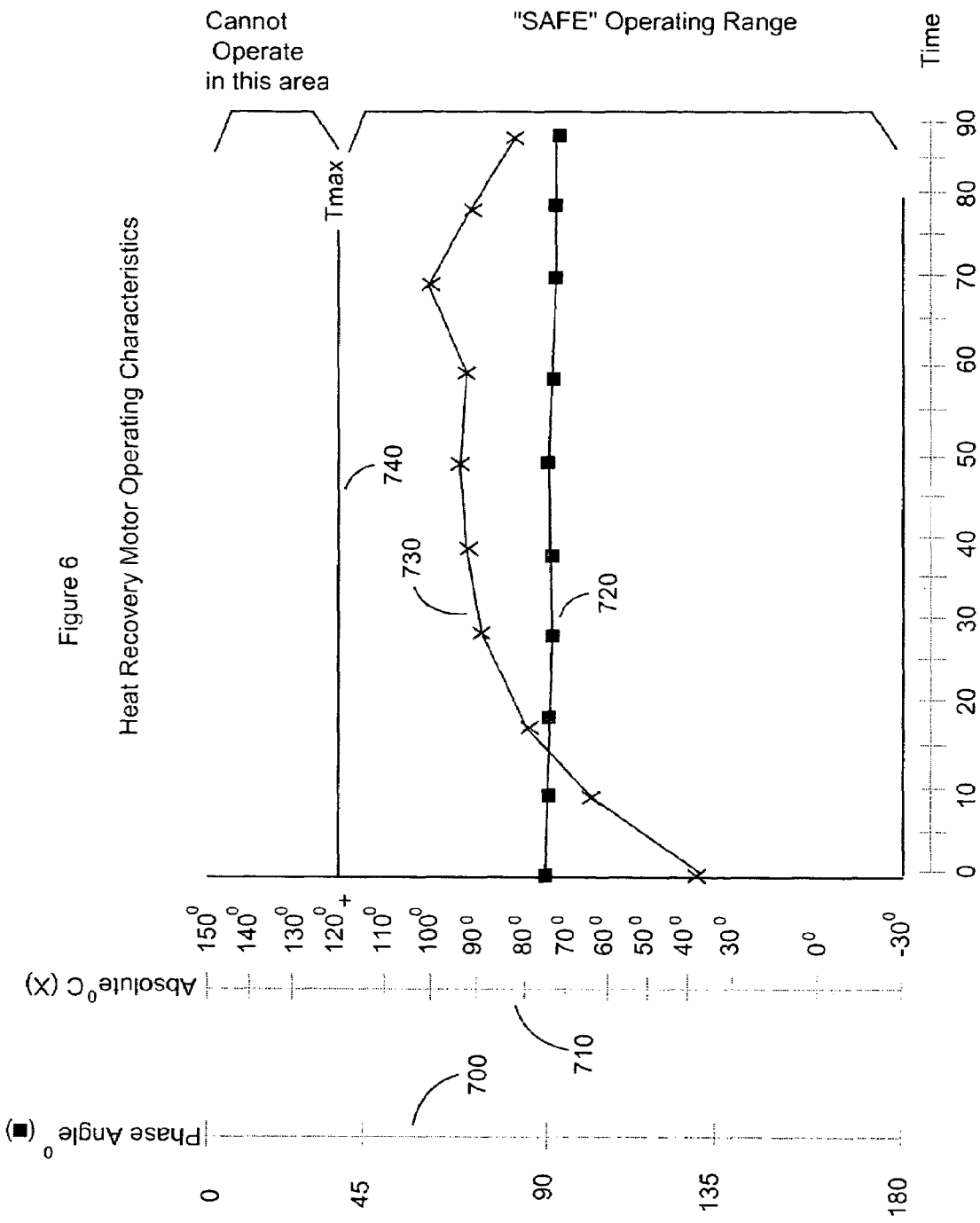
FIG. 6 is a graph showing the relationship between high-phase angle of the voltage applied to the motor and the heat recovery equipped motor winding temperature.

Referring now to FIG. 6, there is shown the operational characteristics of a heat recovery apparatus equipped induction motor, which is connected to a source of AC supply with significant phase delay 720. As a result of thermal inertia of the motor mass and the heat removed by the heat recovery apparatus, the motor absolute temperature slowly rises until it reaches thermal equilibrium 730. The increased efficiency of a heat recovery apparatus will result in an absolute motor operating temperature below the design limit 740, even though motor operational efficiency has been reduced as a result of the phase delay described above.

Figure 7:
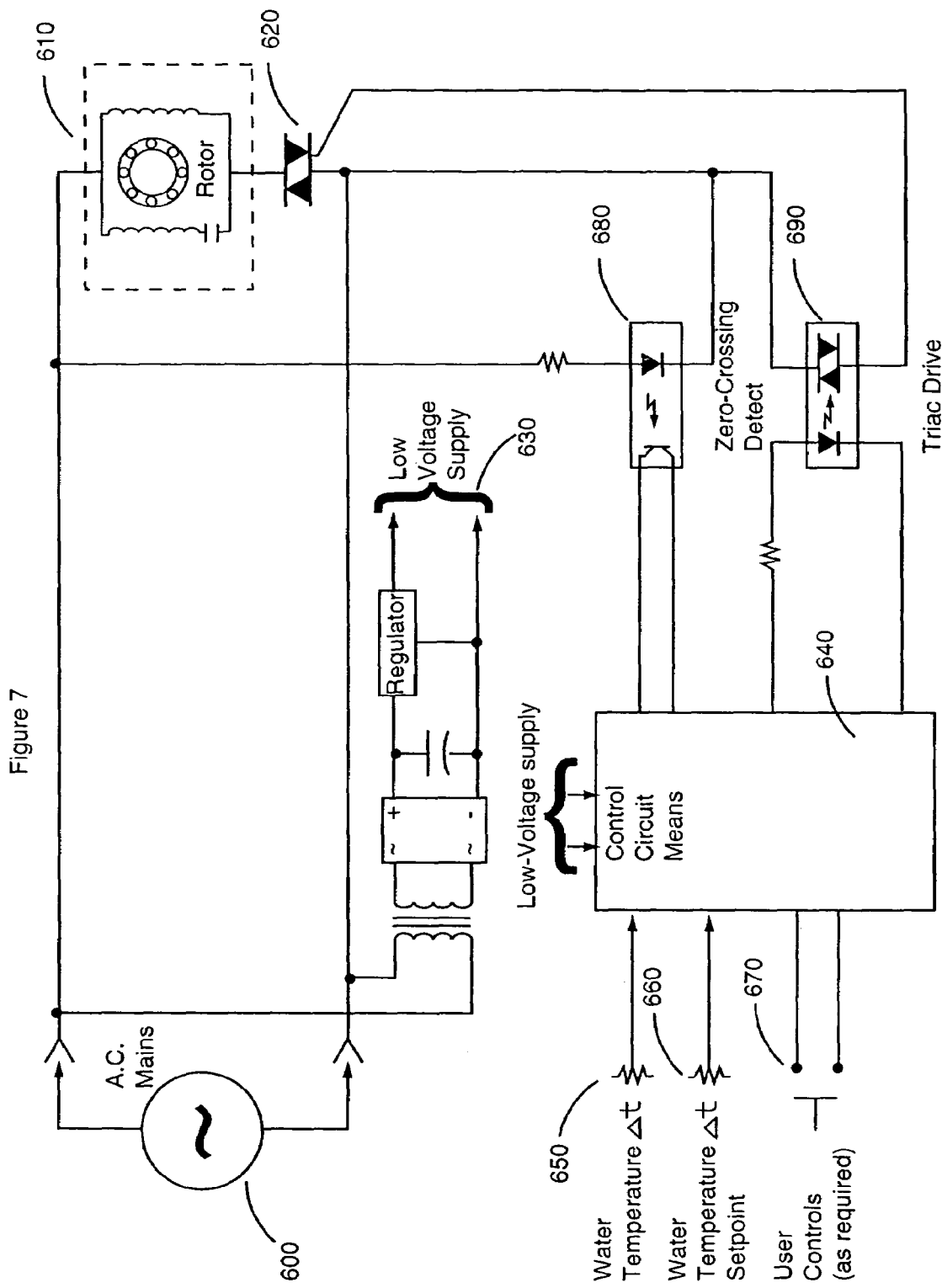
FIG. 7 is a fragment schematic diagram of one embodiment of the present invention.

Referring now to FIG. 7 there is shown a schematic fragment of one preferred embodiment of an apparatus, which is capable of introducing a phase delay in the AC mains supply voltage. A source AC mains supply voltage 600 is applied to low-voltage power supply 630 and one supply lead of a permanent capacitor induction motor 610. A permanent capacitor motor is preferred, as the construction of the motor will allow operation on a phase delayed source of AC supply without modification. Other types of motors, such as split phase designs, may not operate on such an apparatus.

The second supply lead of motor 610 is connected to a semiconductor alternating current switch 620, which is preferably a triac. A zero crossing detect circuit 680 is operably connected to the source of AC supply, with its signal output connected to a control circuit means 640, preferably through an optical coupling. The control circuit means 640 can any suitable controller, but in this embodiment is a Motorola MC68HCS12 microcontroller. The control circuit means 640 is connected to an optically coupled triac driver 690, which is in turn coupled to triac 620.

Optional user inputs may be connected to the control circuit means 640 as required by the final application of the apparatus. For example, a user control input 670 may signal the control circuit means 640 to start and stop motor 610. Water temperature setpoint input 660 is operably connected to control circuit means 640 and provides an input signal based upon the desired water temperature setpoint selected by the user. A water temperature sensor 650 may be placed in communication with the recirculation water described above, whereupon an output signal proportional to Water temperature is directed to control circuit means 640.

The reader skilled in the art will be familiar with input and control circuit means, zero crossing detect, triac drive and triac semiconductor switches as outlined above.

Referring now to FIG. 8 there are shown a flow chart of the start, stop and operational sequence of motor 610 at maximum efficiency and with minimum heating. The entry point TURN ON TRIAC 800 will cause the controller 640 to enable optically coupled triac driver 690, which will cause triac 620 to enter full conduction state. The controller 640 will advance to step WAIT FOR STOP COMMAND 810. If no stop command is pending from user control 670, the controller 640 will loop at step TURN ON TRIAC 800.

The net result will be AC mains voltage applied to the motor for the full 360° conduction cycle of AC mains source 600. The voltage waveform applied to motor 610 is shown in FIG. 3.

If a user stop command is received as input from user control 670, the controller 640 will advance to step TURN OFF TRIAC 820, whereupon triac driver 690 will turn off triac 620. The controller 640 will advance to step WAIT FOR START COMMAND 830. If no start command is pending from user control 670, the controller 640 will loop at step TURN OFF TRIAC 820.

If a user start command is pending from user control input 670, the controller 640 will advance from step WAIT FOR START COMMAND 830 and branch to step TURN ON TRIAC 800, as described above.

Referring now to FIG. 9, there is shown a flowchart diagram of the motor 610 operating from an AC supply means waveform with a significant phase delay as shown in FIG. 4. Upon entry to this flowchart, controller 640 will perform step TURN OFF TRIAC 900, which in turn will signal triac driver 690 to deactivate triac 620, placing it in a current blocking state. The controller 640 will then advance to step WAIT FOR AC MAINS VOLTAGE TO CROSS 0 VOLTS THRESHOLD 910. Controller 640 will accomplish this step by monitoring the "image" voltage of the AC mains source 600, through optically coupled zero crossing detect circuit 680 as described above. If no zero crossing condition is detected at step 910, controller 640 will loop at step TURN OFF TRIAC 900.

At zero crossing condition active, controller 640 will advance to step DELAY # OF ELECTRICAL DEGREES FOR DESIRED WATER TEMPERATURE 930. Step 930 relates the water temperature setpoint 660 previously requested by the user, and input to controller 640, into a time delay expressed in electrical degrees 920. A reader skilled in the art will understand that there is an empirical relationship for each motor 610 between a desired temperature setpoint and a phased delay of the AC mains source 600. Further, the differential between desired water temperature setpoint 660 and the actual water temperature 650 may be integrated into a lookup table, algorithm or other means to allow adjustment of the phase delay of the applied AC means voltage. Increasing the said phase delay will cause a decrease in motor efficiency and increase heat output, preferably raising recirculation water temperature. Likewise, decreasing said phase delay will increase motor operating efficiency and lower heat output. Comparing the desired water temperature setpoint with the actual water temperature and adjusting said phase delay to increase and decrease motor efficiency provides a closed loop recirculation water heater when motor 610 is coupled to a heat recovery means, as described above.

After completing the delay calculated in step 920, controller 640 advances to step TURN ON TRIAC 940, applying AC mains voltage with the desired phase delay as shown in FIG. 4. A reader skilled in the art will understand the triac will stay in conduction only as long as a voltage is expressed across it. By execution of the steps described in FIG. 9, the voltage shown in FIG. 4 will be developed across motor 610, with the time delay equal to "x" degrees 410. The period of "x" time delay is determined by previous experimentation in relationship to the combination of heat recovery apparatus, hydraulic recirculation system and motor characteristics.

Upon completion of step TURN ON TRIAC 940 controller 640 advances to step TURN OFF TRIAC 900 whereupon the above process is repeated.

In the above embodiments, a triac is used for switching. However, a thyristor or silicon controlled rectifier arrangement may be used.

Numerous modifications, variations and adaptations may be made to the particular embodiments of the invention described above without departing from the scope of the invention, which is defined in the claims.

What is claimed is:

1. A heat recovery apparatus with an adjustable setpoint temperature comprising:

an induction motor equipped with a heat recovery unit employing a liquid coolant that is pumped through the heat recovery unit;
    a switching device coupled to the motor and being switchable between a first state wherein significant current flow through the motor is prevented and a second state wherein current flow through the motor is substantially undisturbed;
    user controls for providing motor control input signals;
    an input for receiving liquid coolant setpoint temperature signals;
    a controller responsive to the motor control input signals to control the operation of the motor;
    said controller further being operable to control the operational efficiency of the motor by switching the switching device between said first and second states in a predetermined sequence so as to induce a phase angle delay in an alternating current supplied to the motor; and
    said controller being further being responsive said temperature setpoint signals to vary the operational efficiency of the motor and thereby the heat output of the motor to achieve a liquid coolant setpoint temperature determined by said liquid coolant setpoint temperature signals.

2. The apparatus of claim 1 wherein said controller is further responsive to liquid coolant temperature signals to vary the operational efficiency of the motor to achieve said liquid coolant setpoint temperature.

3. The apparatus of claim 1, further comprising a zero-crossing detector, and wherein said controller is programmed to carry out the following steps in sequence:

upon detection of a zero-crossing point of the positive half cycle of the AC signal switch the switching device to its first state;
    generate a first delay;
    after said first delay, switch the switching device to said second state;
    upon detection of a zero-crossing point of the negative half cycle of the AC signal, switch the switching device to its first state;
    generate a second delay; and
    after said second delay, switch the switching device to its second state.

4. The apparatus of claim 1, wherein the switching device comprises a thyristor arrangement.

5. The apparatus of claim 3, wherein said zero-crossing detector is optically coupled to said controller.

6. The apparatus of claim 3, wherein said switching device is connected to a driver optically coupled to said controller.

7. The apparatus of claim 1, wherein the liquid coolant is water.

8. The method of claim 1, wherein said wherein said first state is a high impedance state and said second state is a low impedance state.

9. A control apparatus for supplying alternating current to an induction motor equipped with a heat recovery unit employing a liquid coolant that is pumped through the heat recovery unit and permitting control of the heat output of the induction motor, said control apparatus being connectable to a switching device for connection in series with the induction motor, the switching device being operative in either a first impedance state wherein significant current flow through the motor is prevented or a second impedance state wherein current flow through the motor is substantially undisturbed, said controller comprising:

user controls for providing motor control input signals;
    an input for receiving liquid coolant setpoint temperature signals;
    a controller responsive to the motor control signals for controlling the operation of the motor;
    said controller further being operable to control the operational efficiency of the motor by generating control signals for switching the switching device between said high and low impedance states in a predetermined sequence so as to induce a phase angle delay in an alternating current supplied to the motor; and
    said controller being further being responsive to said temperature setpoint signals to generate said control signals to vary the operational efficiency of the motor and thereby the heat cutout of the motor to achieve a liquid coolant setpoint temperature determined by said liquid coolant setpoint temperature signals.

10. The apparatus of claim 9, wherein said controller is further responsive to liquid coolant temperature signals for controlling operation of the motor.

11. The apparatus of claim 9, further comprising a zero-crossing detector, and wherein the controller is programmed to carry out the following steps in sequence:

upon detection of a zero-crossing point of the positive half cycle of the AC signal, switch the switching device to its high impedance state;
    generate a first delay;
    after the first delay, switch the switching device to its low impedance state;
    upon detection of a zero-crossing point of the negative half cycle of the AC signal, switch the switching device to its high impedance state;
    generate a second delay; and
    after the second delay, switch the switching device to its low impedance state.

12. The apparatus of claim 9, wherein the liquid coolant is water.

13. A method of controlling the operation of an induction motor with a heat recovery unit employing a liquid coolant pumped therethrough, comprising:

selecting a setpoint temperature for said liquid coolant; and
    varying the heat output of the induction motor to achieve said setpoint temperature by inducing a variable phase angle delay in an alternating current supplied to the motor and thereby varying the operational efficiency of the induction motor.

14. The method of claim 13, wherein the phase angle of the alternating current is varied by:

detecting a zero-crossing point of the positive half cycle of the alternating current and upon detecting said zero-crossing point of the positive half cycle of the alternating current switching a switching device coupled to the induction motor to a first state wherein significant current flow through the motor is prevented;

generating a first delay;

after the first delay, switching the switching device to a second state wherein current flow through the motor is substantially undisturbed;

upon detection of a zero-crossing point of the negative half cycle of the alternating current, switching the switching device to said first state;

generating a second delay; and after said second delay, switching the switching device to said second state.

15. The method of claim 14, wherein said first state is a high impedance state and said second state is a low impedance state.

16. The method of claim 14, wherein said motor is controller by a controller responsive to at least motor control signals, said controller being programmed to carry out said steps.

17. The method of claim 16, wherein said controller is further responsive to signals representing water setpoint temperature and water temperature respectively.

18. The method of claim 16, wherein said controller is optically coupled to said switching device.

19. The method of claim 13, wherein the liquid coolant is water.

20. The method of claim 13, wherein the phase angle delay is adjusted by accessing a lookup table relating phase angle delay to the difference between liquid coolant temperature and setpoint temperature.

* * * * *